UNITED STATES PATENT OFFICE.

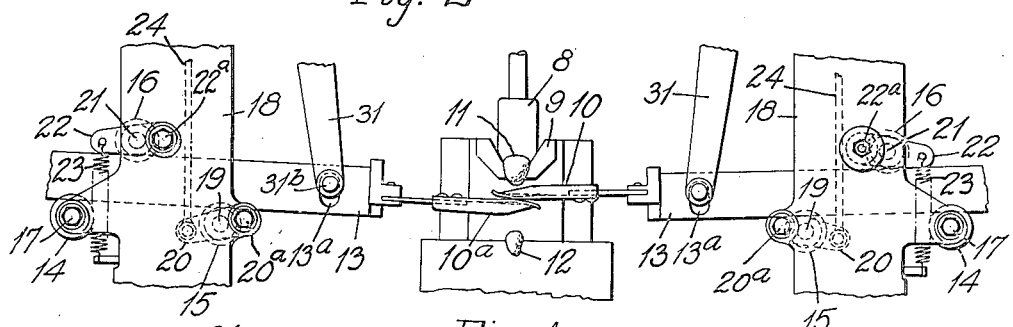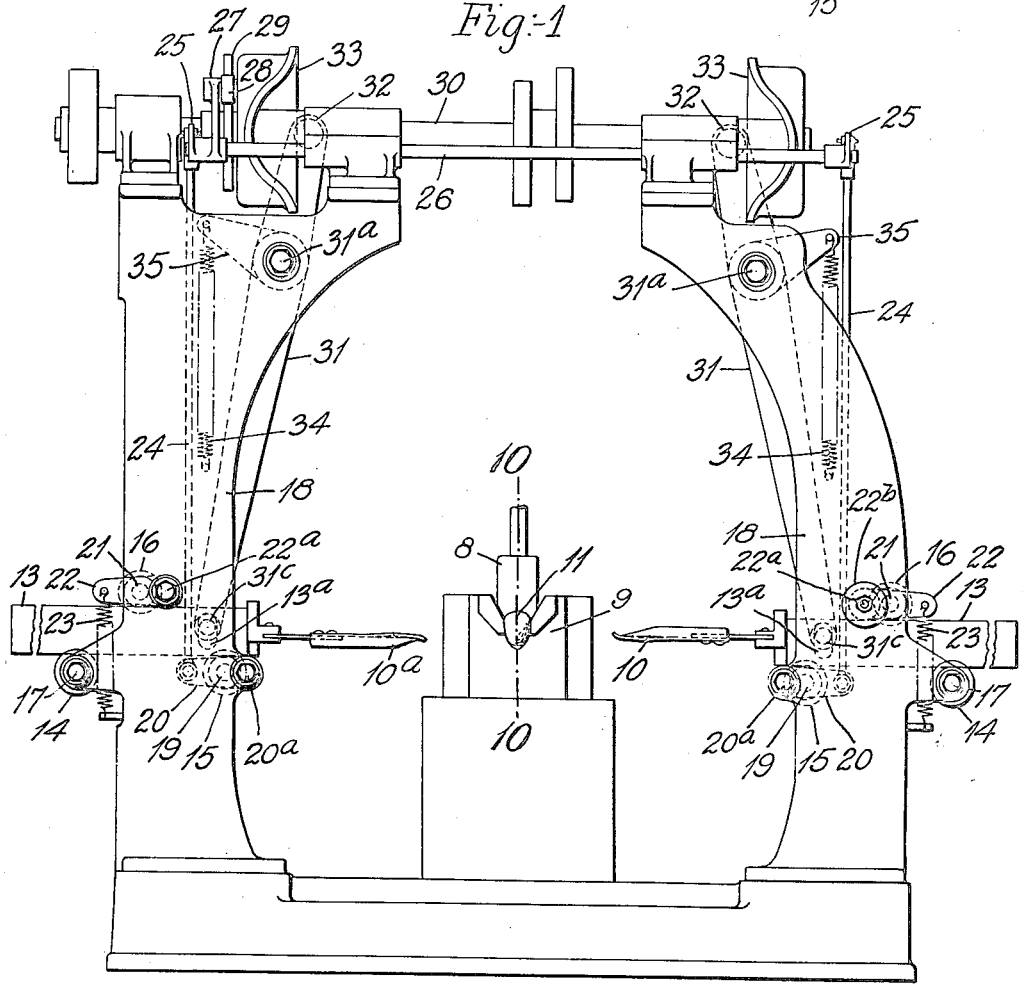

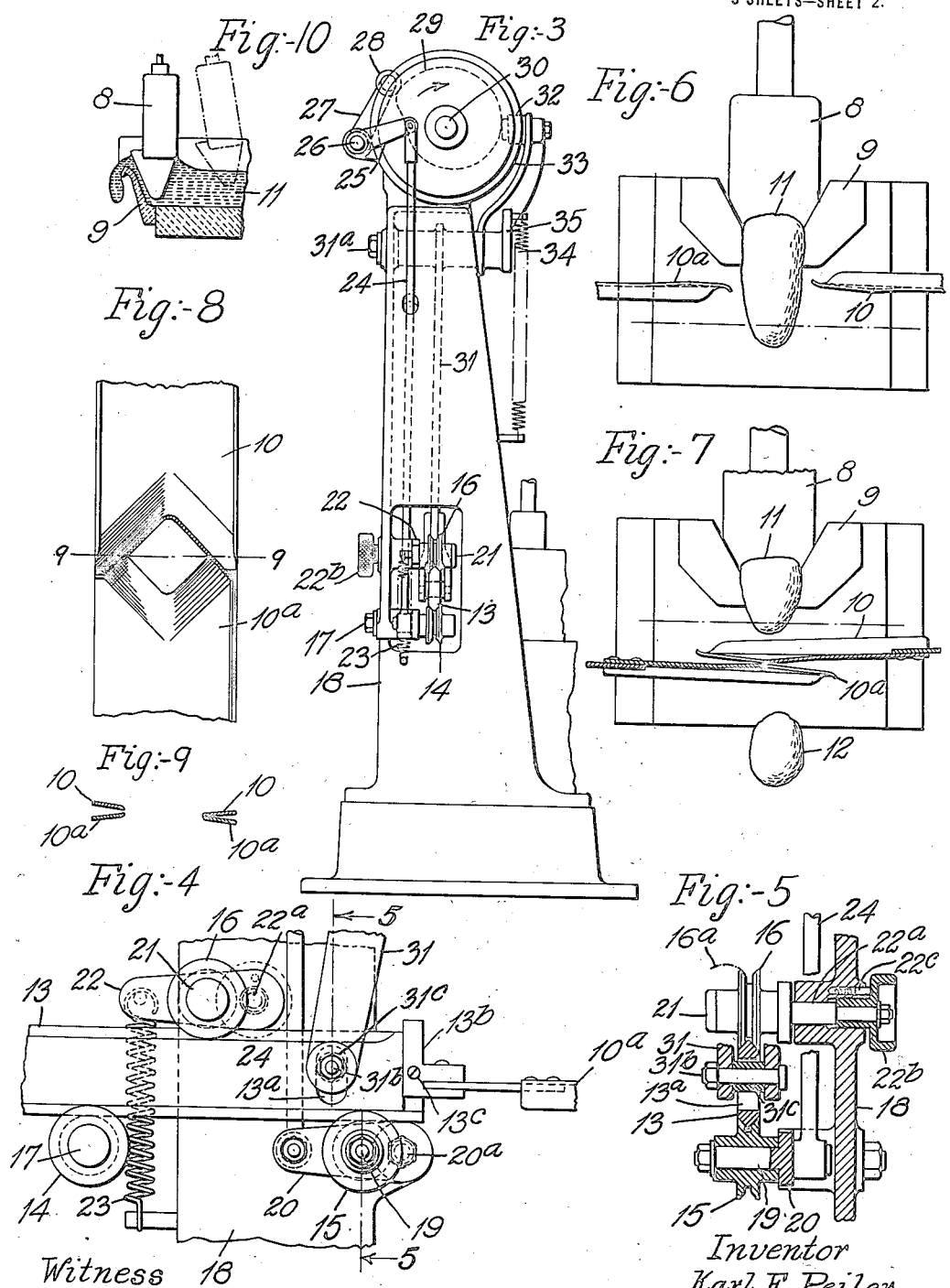

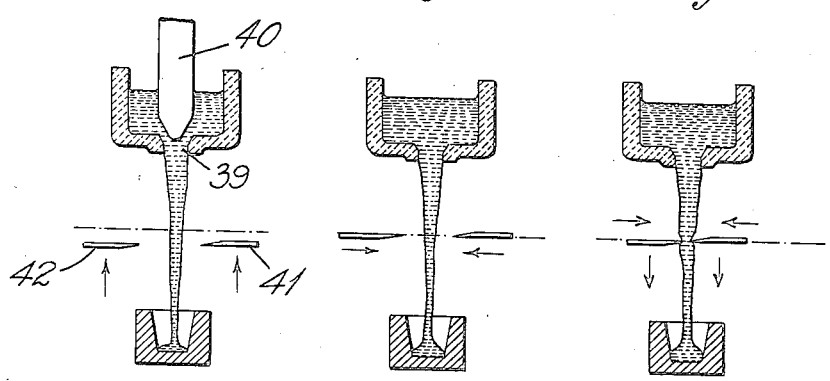
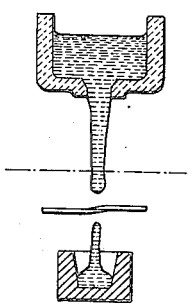
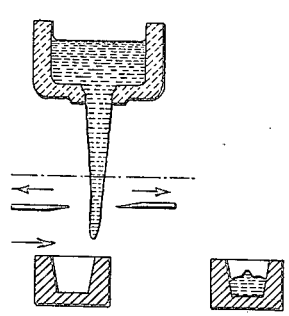
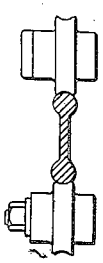
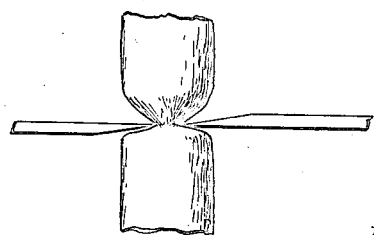
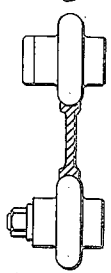

KARL E. PEILER, OF WEST HARTFORD, CONNECTICUT, ASSIGNOR TO HARTFORD-FAIRMONT COMPANY, OF CANAJOHARIE, NEW YORK, A CORPORATION OF NEW YORK.

GLASS-SEVERING.

1,379,594.  Specification of Letters Patent.  Patented May 24, 1921.

Application filed June 18, 1918. Serial No. 240,674.

*To all whom it may concern:*

Be it known that I, KARL E. PEILER, a citizen of the United States, residing at West Hartford, in the county of Hartford and State of Connecticut, have invented new and useful Improvements in Glass-Severing, of which the following is a specification.

This invention relates to mechanism for severing molten glass issuing from a melting tank or other container, either as a steadily flowing stream, or in intermittent drops, to separate the glass into charges or gathers of definite size or quantity, to be formed into articles of glassware, or otherwise treated.

For this purpose it is common to employ shear blades that are reciprocated across the path of the issuing glass; and in order to shorten the time and lessen the area of contact of shears with the hot glass, and minimize the transference of heat from the glass to the shears, and thereby lessen the consequent chilling of the glass and heating of the shears, it has been proposed to move the shear blades away from the supply outlet, while they are cutting through the stream, or through the neck or thread connecting successive drops or gathers. This has hitherto been accomplished by bodily lowering and raising the carriage or carriages on which the severing devices are mounted, thus including an undesirable amount of weight in the parts to be moved, and thereby increasing the weight and lessening the possible rapidity of their movements, besides requiring more room for those movements.

The objects of the present invention are to provide a simple, light, easily operated and efficient mechanism for this purpose, including improved devices for adjusting the cutting edges of the blades accurately into cutting contact, and guiding and holding them firmly but resiliently in contact during their cutting action.

According to this invention, the shear operating and supporting mechanism is constructed and arranged so that the cutter or cutters will be tilted or swung away from the supply outlet while they are severing the stream or the drop or gather issuing from the outlet, and by minimizing the weight of the parts to be moved, and the space required by them. For convenience of reference this movement of the cutters will be herein designated their tilting movement.

In addition to this tilting movement of the blades, means are provided for adjusting the blades by a rocking movement on an axis substantially at right angles to the axis of their tilting movement, by which means the blades may accurately be adjusted so as to maintain the cutting edges in proper cutting contact. For conciseness of reference this will be termed the rocking adjustment.

In the accompanying drawings Figure 1 is a front elevation of a machine which embodies this invention, showing the shear blades in their open position away from the glass supply being delivered from the melting furnace. Fig. 2 is also a front elevation of a portion of the machine, illustrating the shears in the closed and lowered position they occupy after their severing operation. Fig. 3 shows a side elevation of the machine. Fig. 4 is a rear elevation showing in larger scale a portion of the mechanism for supporting and operating one of the shear blades. Fig. 5 is a sectional elevation on the line 5—5 of Fig. 4. Fig. 6 shows on larger scale the shear blades approaching the glass to be cut. Fig. 7 shows the same after the glass has been cut. Fig. 8 shows a plan of the shear blades coming together for their cutting operation.

Fig. 9 is a view projected from Fig. 8, in section taken on the line 9—9 of that figure. Fig. 10 is a side view on the scale of Figs. 1 and 2, and in section taken on the line 10—10 of Fig. 1, showing what is termed the paddle type of feeder, in which the glass is caused to issue from the furnace in substantially segregated drops or gathers. Figs. 11 to 15 inclusive are front views, mainly in section, illustrating in successive steps the application of the present invention to the severing of glass issuing from the furnace continuously in a flowing stream. Fig. 16 is a front view in larger scale illustrating the action of the cutting knives, resulting from their compound movement, in shaping the lower end of the stream or stub of glass above the knives; and also illustrating how the area of contact between the glass and the blades is minimized as a result of their movement. Figs. 17 and 18 are end views showing modifications of the form of the shear blade carriers and their guiding rollers.

The shear blades 10, 10ª are attached to and carried by the inner ends of reciprocating shear bars 13, which may be made of very light construction. Although shown in Figs. 1–6 to be solid, they may be greatly lightened by reducing the thickness between their guiding edges to a thin web, as shown in Figs. 16 and 17, in addition to making them of open, instead of solid form. These bars are guided for longitudinal and tilting movements by their opposite edges, which are engaged by guiding rollers 14, 15, 16. The rollers 14 are mounted on fixed studs 17 projecting from the frames 18, while the rollers 15 are mounted on studs 19, carried by levers 20 which are pivoted at 20$^a$ to the frame 18. The levers 20 are swung upon their studs 20$^a$, to move the inner ends of the slide bars up and down for imparting their tilting movement, by means of connecting rods 24, extending to rocker arms 25 on the ends of shaft 26 (Figs. 1 and 3). Both rods 24 are thus connected to the shaft 26, and therefore both shear bars are correspondingly and simultaneously tilted. The tilting movement is imparted by means of the cam 29 engaging a roller 28 on the cam lever 27 fixed to the shaft 26. The rotation of the cam operates through the levers 20 and the rollers 15 to raise and lower the inner ends of the bars 13, and consequently the blades 10, in conjunction with the endwise movements of those bars.

The pressing rollers 16, engaging the upper sides of the bars 13, are mounted on studs 21, carried by levers 22, which are pivoted at 22$^a$ to the frames 18, and are drawn downwardly by springs 23, so as to yieldingly hold the rollers 16 down upon the tops of the shear bars 13, thus holding the bars firmly, yet with elastic pressure, against the guiding rollers 14 and 15. This elastic holding or following pressure upon the bars enables the shear blades to be maintained accurately and firmly in cutting contact with each other, yielding to any contraction or expansion or warping of the guide bars by heat, due to their proximity to a glass furnace. It has been found difficult to maintain smooth and uniform action of fixed or inelastic guides for various sliding members when thus exposed to intense heat, due to the warping of the sliding members and to the drying out of their lubricating oil. These yielding guides will be found useful for various reciprocating parts of a glass working machine, other than shear slides, which in such machines are exposed to the drying and warping action of the heat of the furnace.

In order to maintain the two points of contact between the shear blades above referred to, and to avoid or correct the abnormal condition illustrated in Fig. 9, provision is made for the aforesaid rocking adjustment of the bars and their blades on an axis extending in the direction of their lengthwise movement. For this purpose either the upper or lower guide rollers for one of the bars, may be arranged for lengthwise adjustment relative to each other. As illustrated herein, the upper follower roller 16 of the right hand bar is thus adjusted, along with its lever 22, the pivot stud 22$^a$ of which is fitted to slide endwise in its seat in the frame 18 (see Fig. 5), and is adjusted endwise by any suitable means herein shown, as a screw knob 22$^b$ journaled upon the stud 22$^a$, and screw threaded into the side of the frame 18. By turning the knob, the lever 22 and its roller 16 are moved endwise, thus rocking the slide bar 13, whichever way may be required to bring the two cutting edges of the opposed shear blades into contact. The abnormal condition illustrated in Fig. 9 would thus be corrected by adjusting the roller 16 of Fig. 5 to the left so as to move the upper blade 10 parallel with the lower blade, and then, if necessary, adjusting the two blades toward or from each other in any suitable way, as for example by adjusting one or both of the blade carrier heads 13$^b$ on the slide bars 13, relative to each other, fastening the heads by screws 13$^c$.

The adjusting knob 22$^b$ is retained in any position to which it may be turned by any suitable device such as a spring plunger 22$^c$, entering suitable notches in the rearward side of the knob.

The coengaging surfaces of the rollers 14, 15 and 16, or the edges of the shear bars 13 are preferably rounded to a curvature indicated by the curved line 16$^a$ in Fig. 5, to enable those rollers to maintain proper guiding contact with the bar at any position of their rocking adjustment.

The endwise movements of the shear bars 13 are imparted by means of levers 31, which are pivoted at 31$^a$ on the frames 18, and are connected with the shear carrying bars 13 by means of studs 31$^b$, carrying rollers 31$^c$, engaging in the slots 13$^a$ of the bars. The upper ends of these levers carry cam rollers 32 which are held in contact with cams 33 on the shaft 30 by springs 34 connected between arms 35 projecting from the levers 31, and the side frames. The rotation of these cams 33, through the levers 31, causes the reciprocation of the bars carrying the shear blades.

The cams are so timed that the shear blades travel toward each other in their upper position, as shown in Fig. 6, until they reach or nearly reach the path of glass being fed and begin to cut. Then the inner ends of the shear bars are swung down so as to carry the blades with, and preferably somewhat faster than the movement of the glass, as shown in Figs. 7 and 11 to 16. After the cut has been completed, and as the shear blades are drawn back, they are again raised to their upper positions, ready for the next cut. The rapidity of the dropping movement and the extent of that movement may, in all cases, be varied to suit different conditions of the glass flow.

As a result of the downward tilting of the inner ends of the shear carrying bars, during the cutting action, the blades are drawn away from the hot glass above, so that only the cutting edges of the blades are in contact with the glass, and that for only an instant, thus minimizing the transference of heat from the glass to the blades. The weight of the reciprocating parts being reduced to a minimum, with the rolling action of the guides, enables the cutting operations to be rapidly performed, thus minimizing the time of contact with the glass. The downward movement may also be utilized to accelerate the fall of the severed charge.

The shear blades 10, 10$^a$, herein illustrated, are conveniently formed of relatively thin sheet metal, which may be bent readily into the desired form, as shown in Figs. 7, 8 and 9, raising the opposed cutting edges of the two blades toward each other, to provide adequate relief behind those edges, so as to insure reliable and constant contact between the cutting edges during their cutting movement, during which time, because of their tilting movement and their V form, the blades are changing their angular relation to each other along a line passing through their two points of contact, which in Fig. 8 are at the line 9—9. These two points of contact approach each other along the lines of their converging V forms, as the shears close, meeting each other at the apexes of those V's. The longitudinal edges of thin blades may be turned away from each other to form stiffening flanges. These however, although preferable, are not necessary features of the present invention.

This invention is adapted for cutting gathers or charges of glass to any desired size from a supply that is flowing either intermittently or continuously. Figs. 1 to 10 illustrate a well-known form of intermittent feeding, in which the glass 11 is extruded from the forehearth of a glass melting tank or furnace by being forced in successive waves or surges over the top of a confining dam or spout 9, by means of a paddle 8, which is moved in the glass toward and from the spout, so as to carry over the dam or spout at each forward movement the proper supply of glass to form a gather. The extruded glass while suspended from the spout is allowed to sag or settle down into a gather of the required size and length below the plane of the shears, these variations in form being obtained by adjusting the time relation between the relative movements of the paddle and shears. The dropping action of the shears while severing is utilized to round or point the bottom of the stub above the shears, which forms the lower end of the next gather. The succeeding gathers are delivered to molds which are successively brought into position to receive the gathers during the intervals which occur between them.

In the method shown in Figs. 11 to 15, the glass is flowed in a constant stream from the furnace outlet, successive charges are severed from the stream, and delivered to molds, suitable time being allowed for changing the molds after the delivery of one gather and before the arrival of the following end of the stream at the mold level. The flow of glass from the forehearth orifice at 39 is regulated by an adjustable plug 40, which may also be pushed down into the orifice to stop the flow altogether when desired. The cutting knives 41 and 42 are disposed at a distance below the orifice suited to the viscosity or other characteristics of the glass to be used, so that the weight of the stub remaining, as shown in Figs. 14 and 15, after a gather has been cut off, will not be sufficient to induce a flow rapid enough to reach the mold level before the succeeding mold has been brought into position. The successive stages of the flow and of the cutting are illustrated in Figs. 11 to 15, the direction of movement being indicated by arrows.

Fig. 16 illustrates in enlarged scale the action of the knives, due to their dropping movement, showing how they round or point the gather, and showing also that the contact between the blades and the glass is practically confined to the cutting edges of the blades.

An important result of the downward movement of the shears while cutting through the column is their pulling, shaping and guiding action upon the resulting stub of glass left by the severing operation, serving to maintain the regular flow of glass through and from the orifice, so as to leave a stub which is symmetrical and of the desired form and which will continue to flow in a straightforward course without sidewise deflections or distortions of form.

This pulling, shaping and guiding action of the shears is all the more useful and important when, as herein shown, the glass is severed fairly close to the outlet or orifice. When severed far enough below the orifice, so that a considerable length of stub is left, which has already left the orifice and has become established in form and direction, its own weight, due to its length, is sufficient to keep it flowing and maintain its direction of flow. But in the ordinary methods of severing by shears having a fixed plane of movement close to the orifice, the shear blades arrest the flow of the column while cutting through it, and support the stub above them for an appreciable period after cutting through and while the shear blades are being withdrawn. This arresting of the column and supporting of the stub tends to spread and upset the stub of glass with something like a riveting action against the outlet end of the orifice, thus distorting the stub from the form desired for the succeeding gather, and also tending to "freeze" the glass in the orifice and against its outlet end, thereby arresting and sometimes stopping its flow, in any case detracting from the symmetry of the succeeding gather, and causing irregularity in the flow, which results in irregularity of time, volume and form of the succeeding flows or gathers. If the flow is resumed at all, it flows more or less out of line due to the continued and unequal adhesion of the glass to one side or another of the outlet.

In the present invention, the dropping action of the shears while cutting through the column of glass not only avoids the pushing back, spreading and upsetting action upon the stub of glass, but in addition to pointing the stub, the blades draw the stub cleanly away from all sides of the outlet orifice, so that it continues its flow at a uniform rate, and in the desired direction and symmetrical form.

The reciprocating bars 13 and their guiding rollers may be made of various forms, as indicated in Figs. 17 and 18. In various ways the different parts of the mechanism may be modified as to form and relative position to adapt them to different conditions of use.

I claim as my invention:—

1. In a machine having reciprocatory shear blades for cutting molten glass, mechanism for independently tilting each of the shear blades downwardly while they are cutting.

2. In a machine having shear blades for separating charges of molten glass, mechanism for reciprocating the shear blades, and means, coördinated with said mechanism for independently tilting each of the shear blades during their reciprocation.

3. In a machine having shear blades for separating charges of molten glass, mechanism for reciprocating the shear blades in a substantially horizontal direction, and mechanism for independently tilting each of the shear blades vertically during their reciprocation.

4. In a machine having shear blades for separating charges of glass from a molten supply, reciprocatory bars carrying the shear blades, rolls supporting said bars, cam actuated means for reciprocating said bars, and cam actuated means for altering the relation of the bar supporting rolls to change the direction of movement of said bars during their reciprocation.

5. In a machine having shear blades for separating charges of glass from a molten supply, bars carrying said blades, fixed and movable rolls supporting said bars, cam actuated levers for reciprocating said bars, and cam actuated levers for raising and lowering said movable rolls during the reciprocation of the bars.

6. In a machine having shear blades with V-shaped cutting notches for cutting charges of molten glass from a supply, mechanism for reciprocating the shear blades toward and from each other, and mechanism for swinging the notched ends of the shear blades downward when they are cutting.

7. In a machine having shear blades with V-shaped cutting edges for cutting charges of molten glass from a supply, mechanism for reciprocating the shear blades toward and from each other, and means for rocking one of the shear blades relative to the other to adjust them into cutting contact at both sides of their V-shaped edges.

8. In a glass severing mechanism the combination of a reciprocating member, a shear blade carried by said member, a guiding device for said member and blade, including a plurality of rolls for guiding one side of said member, and a yieldingly mounted roller for holding said member in contact with said rolls.

9. In a glass working machine having a reciprocating member, a guiding device for said member, including a plurality of rolls engaging with said member at different positions of this length, and a yieldingly mounted follower roller engaging the said member at a point intermediate its engagement by said rolls to hold the said member in contact with said rolls.

10. In a glass working machine having a reciprocating severing member, guiding means for said member provided with means for adjusting the guides to rock the said member substantially on an axis extending in the direction of the reciprocating movement of the member.

11. In a glass working machine having a reciprocating severing member, means including rolls for guiding the said member in its reciprocating movements, and means for adjusting the relative position of the rolls to rock the said member on an axis extending in the general direction of its reciprocating movement.

12. In a glass severing mechanism the combination of a reciprocating member, a shear blade carried by said member, means for guiding said member and blade in its reciprocating movements, including guide rolls engaging with different sides of said member, one of said rolls being resiliently mounted to press the said member yieldingly into engagement with other of the said rolls.

13. In a glass working machine having a reciprocating member, means for guiding the said member in its reciprocating movements, including guiding rolls engaging with different sides of the said members, at least two of said rolls being engaged with one side of said member, and a third roll engaging with another side of said member at a point between its engagement with the other two rolls, said third roll being resiliently mounted to yieldingly hold the said member in engagement with said first named rolls.

14. In a glass working machine having a reciprocating severing member, guiding means for said member including rolls engaging with different sides of said member, and one of said rolls being resiliently mounted and one of said rolls being adjustable in an axial direction to rock the said member, coengaging surfaces of the rolls and of the said member being curved to permit said rocking movement.

15. In a glass working machine, the combination of a reciprocating severing member, means for guiding the member in its reciprocating movements, and for adjusting the position of said member around an axis extending in the general direction of its reciprocating movement, including at least two rolls engaging with one side of said member, a third roll engaging with another side of said member at a point between its point of engagement with the first two rolls, one of said rolls being resiliently mounted to yieldingly hold the said member into engagement with the other two rolls, and one of said rolls being adjustable in an axial direction to adjust the said member around an axis extending in the general direction of its reciprocating movement, the co-engaging surfaces of the roll and of the member being curved to permit said rocking adjustment.

Signed at Hartford, Conn., this 17th day of June, 1918.

KARL E. PEILER.